United States Patent [19]

Sherwood et al.

[11] Patent Number: 4,718,639
[45] Date of Patent: Jan. 12, 1988

[54] TIRE VALVE BODIES

[76] Inventors: Allen L. Sherwood; Allen L. Sherwood, Jr., both of Box 9, Rte. 3, Owego, N.Y. 13827

[21] Appl. No.: 15,707

[22] Filed: Feb. 17, 1987

[51] Int. Cl.$^4$ .......................................... F16K 31/00
[52] U.S. Cl. .................................. 251/366; 137/223; 137/234.5; 152/427
[58] Field of Search ............ 137/223, 234.5; 152/427, 429; 251/366

[56] References Cited

U.S. PATENT DOCUMENTS

| 222,344 | 12/1879 | Braun | 137/223 |
| 2,765,835 | 10/1956 | Paukov | 152/427 |
| 3,280,879 | 10/1966 | Simms | 152/427 |
| 3,432,904 | 3/1969 | Stewart | 137/223 X |

Primary Examiner—Harold W. Weakley
Attorney, Agent, or Firm—Richard G. Stephens

[57] ABSTRACT

A valve body containing a valve core comprises a generally cylindrical body having a tapered flange, allowing the valve body to be installed in a wheel rim so that none of it extends beyond the outer surface of the rim. The valve core is contained in a central tube spaced inwardly from an outer wall of the valve body, allowing entry of an air chuck to apply or check pressure.

5 Claims, 3 Drawing Figures

TIRE VALVE BODIES

Our invention relates to vehicle tire valves, and more particularly to an improved valve body mounting arrangement for tubeless tires which is especially useful in connection with automotive racing vehicles, such as types commonly called "stock cars" and "sprint cars". As will become clear below, the new valve body mounting arrangement also may find utility on various other kinds of vehicles.

Races involving the above-mentioned types of racing vehicles often involve collisions in which the wheels or body portions of different vehicles engage, sometimes many times during a given race. Body engagement of such vehicles, often results in sparks, and in dents to fenders, doors, and other vehicle body parts, but it rarely results in disablement of a vehicle. Such dents often are of little or no concern to stock car racers. Wheel engagement, on the other hand may have consequences deemed much more serious. The wheels of stock cars are most frequently equipped with tubeless tires. Not infrequently, the engagement of two different cars results in the shearing off or other destruction of a tire valve stem on one of the vehicles. The engagement of a bumper on one car with a wheel on another car is particularly likely to cause shearing off of the tire valve on the latter car. Destruction of the valve stem ordinarily not only causes rapid deflation and destruction of a tire, which represents substantial expense, but it also can result in extreme danger to a driver. Importantly, it also results in disablement of a vehicle, causing a potentially-winning driver to lose what may be appreciable prize money. A primary object of the invention is to provide a tubeless tire valve mounting arrangement in which tire deflation and consequent vehicle disablement are virtually eliminated, no matter the amount of and type of wheel engagement which occurs.

Another object of the invention is to provide a tubeless tire valve mounting arrangement which avoids tire deflation in the event of wheel engagement, but which also does not interfere with inflation of or pressure-checking of a mounted tire. To provide better traction, the rear axle differential is usually disabled in racing cars of the mentioned types. To lessen the tire wear which absence of differential drive tends to cause during travel on a generally circular track, stock car racers traditionally inflate the tires on two drive wheels with materially different pressures, to give one drive wheel a greater circumference than the other. The pressures which racers choose to use in their tires also varies markedly, depending upon whether a race is to occur on a dirt track or an asphaltpaved track. Tire pressures are deemed very important, so that racers use tire pressure gages which are much more accurate than those used by ordinary motorists.

A further object of the invention is to provide a tire valve assembly which can be readily and inexpensively fitted to existing tire rims.

Other objects of the invention will in part be obvious and will in part appear hereinafter.

The invention accordingly comprises the features of construction, combination of elements, and arrangement of parts, which will be exemplified in the constructions hereinafter set forth, and the scope of the invention will be indicated in the claims.

In accordance with a central concept of the present invention, the valve body and stem used on a standard wheel rim of a vehicle are recessed sufficiently within the wheel rim that no portion of the valve body or stem protrudes beyond the outer surface of the wheel rim to which the valve body is attached.

The following prior U.S. patents may be of interest: U.S. Pat. Nos. 544,167, 1,584,633, 2,219,190, 2,844,182, 1,444,340, 1,822,592, 2,255,146, 3,280,879, 1,460,753, 2,007,916, 2,823,724.

For a fuller understanding of the nature and objects of the invention reference should be had to the following detailed description taken in connection with the accompanying drawings, in which.

Figure 1:
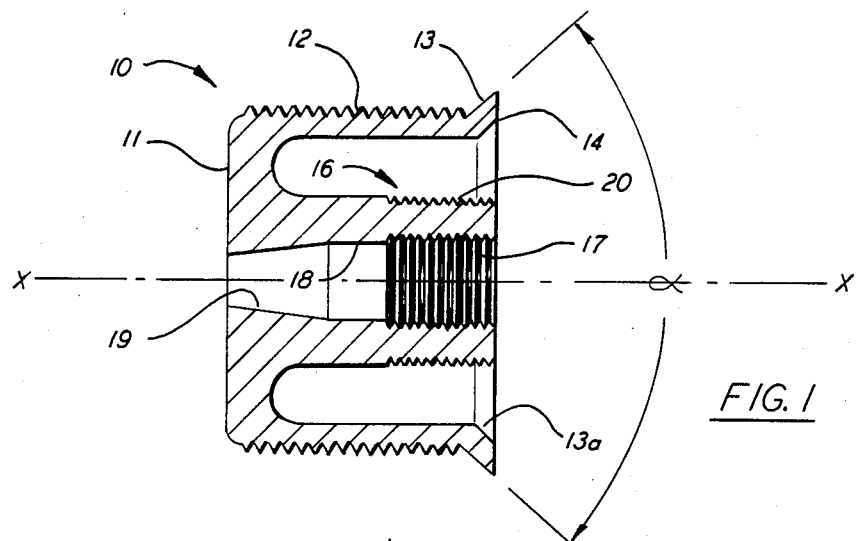
FIG. 1 is a cross-section view illustrating a preferred form of valve body according to the invention.

Referring to FIG. 1, the valve body 10 thereshown comprises an integral annular metal generally cup-shaped part preferably formed of brass. The valve body has a base wall portion 11, with a generally cylindrical outer wall portion 12 extending from the base wall portion and terminating in a tapered or axially and radially outwardly extending flange portion 13 having a flat surface at 14. Flange 13 is shown provided with an inner surface 13a having the same taper. The axial direction is indicated by axis x—x, and annular face 14 is shown extending perpendicular to that axis. The exterior surface of outer wall portion 12 is shown threaded, and in one satisfactory embodiment a ⅜ inch, 32 threads per inch threading was used. The included angle $\alpha$ of the taper of the flange is preferably 82°, a common taper used for flathead screws, or a 90° angle, which is common for metric screws, although other angles certainly may be used. In the mentioned embodiment, the overall axial length of the valve body was 0.500 inch.

The valve body 10 also includes a central tube portion 16 spaced radially inwardly from the outer wall portion 12, and extending axially from the base wall portion to an axial position close to, but not beyond outer surface 14. In FIG. 1 tube portion 16 is shown extending precisely even with the surface 14. In the mentioned embodiment, the annular space between the outer wall and the central tube portion was approximately 0.10 inch. The central tube portion 16 includes a through passageway comprising an internally threaded portion 17, an unthreaded cylindrical portion 18 and a tapered portion 19. A length of the outer periphery of central tube portion 16 is shown threaded at 20.

Figure 2:
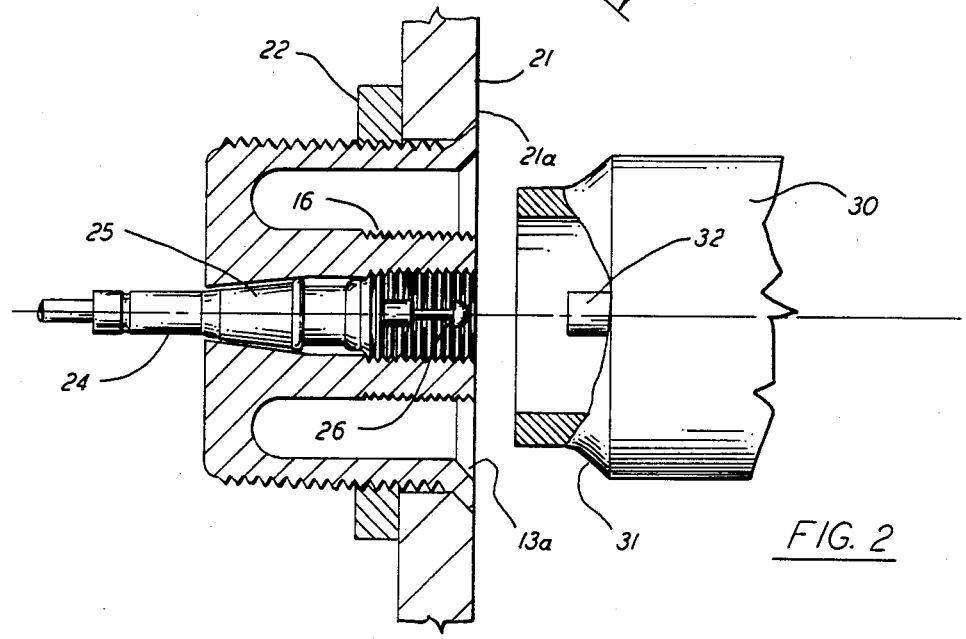
FIG. 2 is a cross-section view showing the valve body of FIG. 1 installed on a wheel rim, which is only partially shown, with a known form of air chuck, or pneumatic connector shown engaging the valve body.

Referring now to FIG. 2, in order to install valve body 10 in a conventional wheel rim, a portion of which is shown at 21, the usual uniform-diameter valve stem hole in the rim is first countersunk, with a taper matching that shown at $\alpha$ for flange 13 in FIG. 1. The valve body is then inserted to extend through rim 21, with flange 13 seating in the rim, and so that surface 14 of the valve body does not project beyond outer surface 21a of rim 21.

In FIG. 2 a metal ring nut 22 is shown threaded onto the outer wall 12 of the valve body to clamp the valve body to the rim. The nut 22 is shown provided with a knurled outer periphery to facilitate tightening of the nut with pliers, but the nut instead may have a plurality of flat shoulders, e.g. hexagonal outer configuration, to allow tightening with a wrench.

It is not strictly necessary that the valve body be secured in place by means of threaded nut 22. The external threads on outer wall 12 can be omitted, and the valve body affixed to the rim by brazing, or welding, by use of an epoxy resin adhesive, or by soft soldering. However, even if one of those alternative means of securing the valve body is used, the use of external threads on outer wall 12 and nut 22 tends to facilitate affixing of the valve body to the rim in an air-tight manner, by holding the valve body in place while brazing, soldering or welding occurs, or while an epoxy resin sets. The nut 22 may be deformed, of course, by brazing or welding to form a seal.

In order to provide an essentially air-tight construction when not welding, brazing or soldering, the tapered surface of flange 13 and/or the countersunk surface of the rim are preferably coated with a sealant prior to installation of the valve body. The sealant preferably comprises an RTV (room temperature vulcanizing) silicone sealant such as any of the following types available from General Electric Company, Waterford, N.Y.: RTV 102, RTV 103, RTV 106, RTV 108, or Dow Corning 732 or 736 sealant.

In FIG. 2 a completely conventional valve core 24 is shown threaded into the central tube portion of the valve body, so that a tapered rubber or elastomeric sleeve 25 of the valve core seats against taper 19 of the valve body, and at that position the end of operating pin 26 of the valve core is situated at or very near the outer end of central tube portion 16. The end of pin 26 does not extend beyond surface 14 of the valve body, nor beyond outer surface 21a of the rim. The valve core may comprise, for example, the standard valve core Part No. 4920 sold by Coronet Parts Mfg. Co., New York, N.Y.

In FIG. 2 the end of a conventional air chuck 30 widely used with air hoses and air gages is shown situated adjacent the valve body. The air chuck has a nose 31 having a tapered outer periphery shown partially cut away, and an operating pin 32. To apply air to a tire-rim assembly equipped with the valve body of FIG. 1, or to measure the pressure in such an assembly, air chuck 30 is pressed against the valve body, seating on surface 13a, so that a portion of nose 31 enters the annular space between outer wall 17, central tube portion 16 of the valve body, allowing operating pin 32 to engage actuating pin 26 of the valve core, thereby providing pneumatic communication between an airhose and the inside of the tire (not shown) mounted on rim 21.

Some air chucks which may be used with the valve body include Models 3500D and 4663 tire gauge available from Schrader Automotive, Inc., and a Model 923 tire gauge available from Milton Industries, Inc. Provision of the threads at 20 on the external surface of central tube portion is optional. While a variety of available air chucks will extend far enough into the valve body, in the annular space between the outer wall and the central tube portion, to actuate the valve core operating pin 26, some air chucks, such as those used at many service stations, will not. While the air chucks used by most racers will fit on the valve body described above, the provision of external threads at 20 on the central tube portion will allow various adapters to be used, such as No. 441 sold by Milton Industries, Inc. of Chicago, Ill. or No. 3680C sold by Schrader Automotive, Inc. of Nashville, Tenn.

Figure 3:
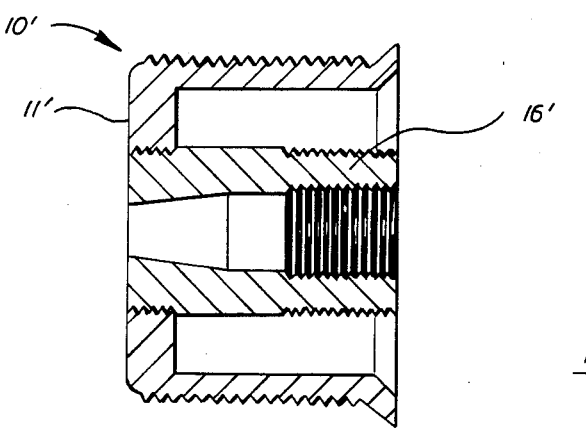
FIG. 3 is a cross-section view of an alternative form of valve body.

While the valve body 10 shown in FIGS. 1 and 2 is a single integral parat, a valve body formed of two parts may be constructed without departing from the invention. As shown in FIG. 3, the central tube member 16' may be formed separately, and then threaded or staked into the base wall 11' of a cup-shaped body 10 '. A thread mismatch may be provided, so that tube member 16' thereafter cannot be screwed out of cup member 10'. Central tube member 16' instead may be brazed to cup member 10'. Forming central tube member 16' separately tends to simplify the provision of threads on the exterior of that member, if provision of such threads is deemed desirable.

An important feature of the invention is that the valve body may be installed using very simple tools, with virtually no skill being required. The valve body will automatically center itself in the rim hole which has been countersunk, and the countersinking can be readily accomplished using a countersink tool in a portable electrical drill. The valve body is quite inexpensive to fabricate, with most of the operations needed to form it being done on an automatic screw machine.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. A valve body for use on a metal wheel rim adapted to carry a tubeless tire, comprising a rigid annular cup member having a base wall portion, a generally cylindrical outer wall portion extending from base wall portion and terminating in an axially and radially outwardly extending flange portion, a generally cylindrical central tube portion rigidly spaced radially inwardly from said outer wall portion and extending axially from said base wall portion a distance such that the end of said tube portion does not extend axially beyond said flange portion, said tube portion being internally threaded to receive a valve core.

2. The valve body of claim 1 wherein an external surface portion of said outer wall portion is externally threaded to receive a nut to clamp said valve body to said wheel rim.

3. The valve body of claim 1 wherein an end length of said tube portion is externally threaded.

4. The valve body of claim 1 wherein said cup member and said central tube portion comprise an integral metal member.

5. The valve body of claim 1 wherein said central tube portion comprises a metal member fixedly attached to said annular cup member.

* * * * *